(12) United States Patent
Sompalli et al.

(10) Patent No.: US 12,331,165 B2
(45) Date of Patent: Jun. 17, 2025

(54) CATALYST SYSTEM FOR CURING PHENOLIC RESOLE RESINS

(71) Applicant: BAKELITE UK HOLDING LTD., Penarth (GB)

(72) Inventors: Krishnama Naidu Sompalli, Gajuwaka (IN); Srinivasan Narashimhan, Chennai (IN)

(73) Assignee: BAKELITE UK HOLDING LTD. (GB)

( * ) Notice: Subject to any disclaimer, the term of this patent is extended or adjusted under 35 U.S.C. 154(b) by 0 days.

(21) Appl. No.: 16/977,810

(22) PCT Filed: Mar. 6, 2019

(86) PCT No.: PCT/IN2019/050190
§ 371 (c)(1),
(2) Date: Sep. 2, 2020

(87) PCT Pub. No.: WO2019/171399
PCT Pub. Date: Sep. 12, 2019

(65) Prior Publication Data
US 2020/0399416 A1   Dec. 24, 2020

(30) Foreign Application Priority Data

Mar. 6, 2018  (IN) .............................. 201821008160

(51) Int. Cl.
*C08G 8/10*  (2006.01)
*C08G 8/36*  (2006.01)
(Continued)

(52) U.S. Cl.
CPC ............... *C08G 8/10* (2013.01); *C08G 14/06* (2013.01)

(58) Field of Classification Search
None
See application file for complete search history.

(56) References Cited

U.S. PATENT DOCUMENTS 2,772,246 A * 11/1956 Simon ...................... C08K 5/51
                                                    521/181
4,001,148 A *  1/1977 Simic ...................... C08K 3/011
                                                    521/106
(Continued)

FOREIGN PATENT DOCUMENTS

CN         103360991 A  * 10/2013
GB           1588357 A  *  4/1981  ............. C08G 14/06
(Continued)

OTHER PUBLICATIONS

Pizzi et al., "Self-neutralizing acid-set PF wood adhesives," Holz als Roh- und Werkstoff, vol. 44, pp. 22-234 (1986) (Year: 1986).*
(Continued)

*Primary Examiner* — Ha S Nguyen
(74) *Attorney, Agent, or Firm* — Edmonds & Cmaidalka, P.C.

(57) ABSTRACT

The present invention relates to a catalyst system which improves the work life of acid-catalyzed resole resins at higher ambient temperatures and provides extended shelf life. The catalyst system comprises an inorganic acid catalyst and one or more polyhydric alcohols. In particular, the present invention relates to a catalyst system wherein the inorganic acid and the alcohol do not convert to an ester when added to the resole resin.

14 Claims, 3 Drawing Sheets

(51) Int. Cl.
    *C08G 14/06*         (2006.01)
    *C08K 3/32*          (2006.01)
    *C08K 5/053*        (2006.01)
    *C08L 61/06*        (2006.01)

(56) References Cited

U.S. PATENT DOCUMENTS

| | | | | |
|---|---|---|---|---|
| 4,146,513 | A * | 3/1979 | Weaver | C08L 61/34 |
| | | | | 525/503 |
| 5,032,642 | A | 7/1991 | Lemon et al. | |
| 5,795,933 | A | 8/1998 | Sharp et al. | |
| 5,944,938 | A * | 8/1999 | Winterowd | C09J 5/04 |
| | | | | 525/503 |
| 2004/0082713 | A1 | 4/2004 | Tutin et al. | |

FOREIGN PATENT DOCUMENTS

| | | | |
|---|---|---|---|
| JP | 2005075938 | | 3/2005 |
| JP | 2005171029 A * | | 6/2005 |
| JP | 2006273899 | | 10/2006 |
| SU | 1206284 A1 * | | 1/1986 |

OTHER PUBLICATIONS https://chem.libretexts.org/Bookshelves/General_Chemistry/ChemPRIME_(Moore_ et al.)/08%3A_Properties_of_Organic_Compounds/8.14%3A_Alcohols (Year: 2023).*
https://chem.libretexts.org/Bookshelves/Organic_Chemistry/Basic_Principles_of_Organic_Chemistry_(Roberts_and_Caserio)/15%3A_Alcohols_and_Ethers/15.08%3A_Polyhydric_Alcohols (Year: 2023).*

* cited by examiner

PHOSPHORIC ACID (50%) : ETHYLENE GLYCOL (30%) : GLYCEROL (20%)

$^{31}$P NMR PHENCAT-382
Analyzed on Feb-2017, solvent :Methanol-$d_4$

PHOSPHORIC ACID (50%) : ETHYLENE GLYCOL (30%) : GLYCEROL (20%)

CATALYST SYSTEM FOR CURING PHENOLIC RESOLE RESINS

FIELD OF INVENTION

The present invention relates to a catalyst system which improves the work life of acid-catalyzed resole resins at higher ambient temperatures and provides extended shelf life. The catalyst system comprises an inorganic acid catalyst and one or more polyhydric alcohols. In particular, the present invention relates to a catalyst system wherein the inorganic acid and the alcohol do not convert to an ester when added to the resole resin.

BACKGROUND OF INVENTION

Phenol formaldehyde resins are the first thermoset polymers ever discovered and commercialized as early as 1910s. Phenol and formaldehyde react together to form two different classes of products called Novolacs or Resoles. Depending on the conditions of the reaction either of these products can be manufactured.

Acid catalysts and lower mole ratio of formaldehyde to phenol result in the formation of novolac type of products and alkali catalyzed with higher mole ratio of formaldehyde to phenol result in the formation of resoles. Bach of these types have characteristic properties and are used in specific applications. Generally, Novolacs are available as solid flakes, lumps, powders as well as in a solution with polar solvents. Resole resins am available mostly in liquid form either in water or in other polar solvents.

Both the products have their own industrial applications. To name a few, Novolacs are used in friction pads and liners, abrasive wheels, refractory bricks, foundry sleeves. Novolacs need an external curing agent, usually Hexa Methylene Tetra amine (aka as HEXA) and temperatures around 150° C. and a cross linking agent to make a thermoset polymer.

Resoles are used in the manufacture of decorative laminates, abrasive papers and in fibre reinforced plastics. Resoles can cure at ambient temperature in the presence of an acid catalyst or at lower temperatures below 100-120° C.

Resoles require a catalyst to react and cure completely at ambient temperature. For industrial applications, a minimum work life is required once the catalyst is mixed with the resole. If the job is not done within this workable life, the resin and catalyst start reacting to slowly form a solid thermoset material and therefore, does not serve the purpose. As the temperature increases, the work life becomes less while some of the industrial applications do need a longer work life. Especially in the tropical regions, the ambient temperatures can often exceed 35-40° C. at which temperature the work life of the resole with the catalyst is so short that the mix cannot be used for any of the industrial applications mentioned earlier.

The common catalysts suitable for use at ambient temperatures for curing a Phenol formaldehyde resole consists of strong acids both inorganic and organic and partial or full esters of alcohols and acids. These catalysts work well giving sufficient work life for end use application at lower temperatures around 20-25° C. Also, in advanced countries, the shop floor temperature would be maintained below 25° C., whenever a resole is used with an ambient temperature catalyst.

Often in developing countries there is limited/no control of shop floor temperature where the job is done. Also during humid weather conditions, the ambient temperature goes up to 40-45° C. There is therefore a need for the development of alternate catalyst systems for curing a phenolic resole for said weather/shop floor conditions.

The prior art, has long sought ways to address the problem, however, the available solutions still have certain drawbacks as discussed below:

Phenolic resole resins have long been cured with strong acids, such as sulfuric acid and organo-sulfonic acids. When used alone, these acids cause rapid hardening of most resole resins even at an ambient temperature, complicating the use of such resins for many applications. Several studies have been carried out in the past in an effort to retard the rate of resin cure at temperatures below the desired curing condition as a way of prolonging the pot life of such resin systems.

U.S. Pat. No. 5,378,793 describes the use of partial phosphate esters to cure phenolic resins. The cure reaction takes place more slowly than when using strong acids.

In U.S. Pat. No. 5,243,015, a latent catalyst comprising a salt of a primary or secondary amine and a strong acid is used. This latent catalyst improves storage stability (pot life) of the resole resin composition, while providing a cure rate at an elevated temperature comparable to the rate obtained using conventional strong acid catalysts. Strong acids also may be added to the composition, to an extent to act synergistically with the latent catalyst to accelerate the rate of reaction; but preferably not in an amount which would cure the resin at a commercially useful rate by itself.

U.S. Pat. No. 5,378,793 (European Patent Application 539,098) represents another approach. This patent discloses using a partial phosphate ester as a hardener for phenolic resole resins. The partial phosphate ester is prepared by reacting (partially esterifying) condensed phosphoric acids, such as orthophosphoric acid, pyrophosphoric acid, tetraphosphoric acid or phosphorus pentoxide under stringent conditions of temperature and vacuum, with polyols, such as glycerol, pentaertrythritol, sucrose and others to a constant free acidity value.

U.S. Pat. No. 5,864,003, represents another approach. This patent discloses using a latent curing agent selected from a particular class of nitrogen-containing acidic phosphorus compounds made from either phosphoric acid or phosphorous acid. Phosphoric acid equivalents may also be used such as pyrophosphoric acid, tetraphosphoric acid or phosphorus pentoxide as the phosphoric acid source.

U.S. Pat. Nos. Re 32,720 of Jul. 26, 1988 and Re 32,812 of Dec. 27, 1988 to P. H. R. B. Lemon et al are further illustrative of the literature which discloses room temperature hardening of highly alkaline phenol-formaldehyde resole resins with an ester curing agent. U.S. patent application Ser. No. 149,102 which was filed on Jan. 27, 1988 to Detlefsen et al, now U.S. Pat. No. 4,961,795 which issued on Oct. 9, 1990, shows the use of aliphatic alcohols to moderate or retard the hardening of phenolic resole resins with ester functional hardening (curing) agents.

It is reported that the partial phosphate ester hardener exhibits a delayed action, i.e., the hardener cures the resole relatively slowly at a lower temperature, but allows a rapid cure when the temperature is increased.

A disadvantage of using partial phosphate esters as curing agents is that pot life of the pre-polymeric resin (for example a phenolic resin)/partial phosphate ester mix is only extended for a few hours limiting the use of the partial phosphate ester to processes where long term storage is not required such us hand lay-up and pultrusion. Use of the partial phosphate esters in bulk moulding compounds and sheet moulding compounds, where storage in the order of weeks and months is required, is not possible.

A further disadvantage of using partial phosphate esters is the sharp increase in viscosity on initial mixing of the partial phosphate ester with a pre-polymeric resin (such as a phenolic resole).

Therefore, there remains a need for a resole resin composition having a cure behavior that provides a long work life at temperatures below curing conditions, and exhibits a rapid hardening at elevated cure temperatures especially in warmer countries. This calls for development of a catalyst system that gives a longer work life when a resole resin is mixed with a cure catalyst at elevated ambient temperatures.

OBJECT OF THE INVENTION

The object of the invention is to develop catalyst systems for curing phenol formaldehyde resole resins at higher ambient temperatures that prevail in many tropical countries in the Summer. The catalysts should have long work life (about 2 to 4 hours) at ambient temperatures of 35-40° C. and are required to enable the industry to make large components that can be used in mass transportation and railway coaches.

Besides work life, the open time also has to be addressed. Open time is the time that is required once the resin/catalyst system has started reacting till the composite/job has become hard to be sent to an oven for final curing. The open time should not be too long or too short. Usually about 8 hours, or overnight standing should be enough.

The curing cycle inside the oven is important as well, since this affects the overall productivity. Therefore, catalyst system is developed in an attempt to solve the problem in the art of resins having very long or very short curing times. The mechanical and fire properties on the end component decide this cure time.

The catalyst system of this invention provide a means for retarding the rate of hardening of phenolic resole resins over a wide temperature range to provide better work life for the resole resin.

SUMMARY OF INVENTION

Figure 1:
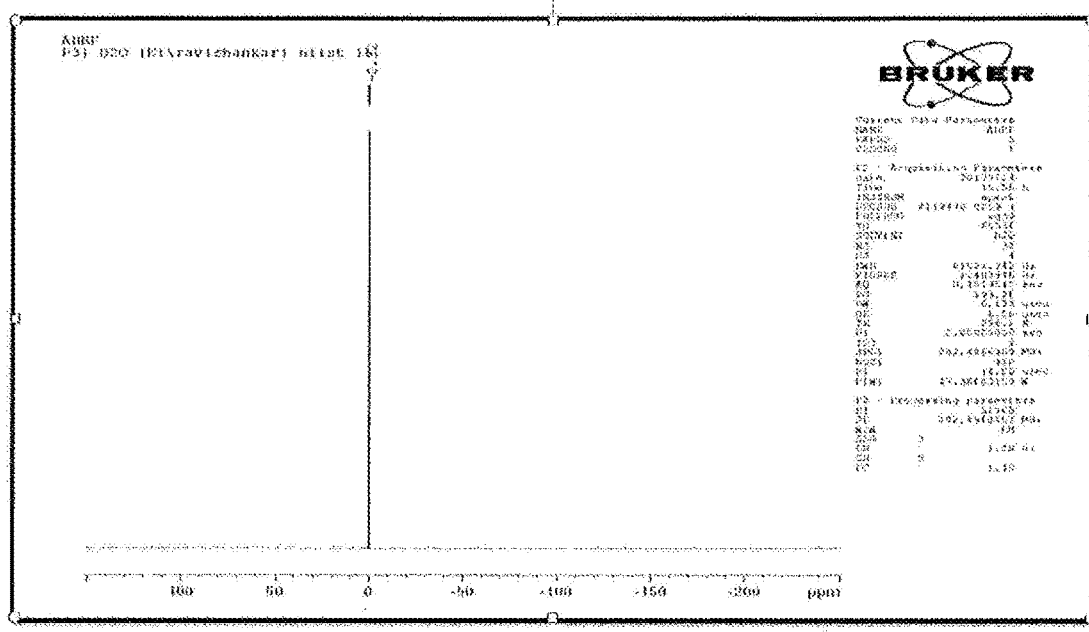
FIG. 1: P-31 NMR of the catalyst according to the present invention comprising a phosphoric acid, ethylene glycol, and glycerol.

In one aspect, the present invention provides a catalyst system for improving the cure time of acid-catalyzed resole resins at higher ambient temperatures which comprises an inorganic acid and one or more polyhydric alcohols.

In another aspect, the present invention comprises the resole resin composition comprising the catalyst system and a method for its preparation.

Yet another embodiment of the present invention comprises a process for the preparation of the resole resin composition comprising the catalyst system of the present invention.

This invention is based on the objective of increasing the time period for the phenol formaldehyde resole resin to gel and then cure. Once the initiation step is slowed down, the subsequent propagation of the reaction kinetics takes place at a controlled rate. Controlling the reaction kinetics helps in providing slower release of water molecules during the cure that escape out thereby leading to lesser voids on the cured specimen.

The novel feature includes identifying certain chemical types of compounds that can prolong the gel formation, especially at high ambient temperatures. These are based on small polyhydric, dihydric/trihydric aliphatic alcohols and inorganic acid which are stable and do not react to form an ester.

DETAILED DESCRIPTION

For the purposes of the following detailed description, it is to be understood that the invention may assume various alternative variations and step sequences.

Thus, before describing the present invention in detail, it is to be understood that this invention is not limited to particularly exemplified embodiments. It is also to be understood that the terminology used herein is for the purpose of describing particular embodiments of the invention only, and is not intended to limit the scope of the invention in any manner.

The present invention is based upon the finding that specific inorganic acids when employed in conjunction with an alcohol when added to the resole as such without forming the ester result in better advantages with respect to work life when compared with the esters which are known and used in the prior art.

One embodiment of the present invention provides a catalyst system for improving the cure time of acid-catalyzable resole resins at higher ambient temperatures which comprises an inorganic acid and one or more polyhydric alcohols.

In a specific embodiment, the inorganic acid and the polyhydric alcohol are added as such to the resole, and these components retain their identity in the resole resin during the storage period without converting to the ester. The above fact is important since it results in catalysts having a better gel time and total curing time than the catalysts having preformed esters. Gel time indicates the time taken for a mixed resin system to gel or become so highly viscous that it can no longer be considered workable, and cure time refers to the time needed to reach optimum viscosity at a certain temperature. Both these factors determine the work life of the resin system.

Suitable inorganic acids which can be used for the purposes of the present invention include, but are not limited to phosphoric acid, sulfuric acid, nitric acid, hydrochloric acid partially neutralised poly acids, example sodium dihydrogen phosphate Examples of polyhydric alcohols which may be used include polyols that can be used to produce the partial phosphate esters include the following or blends of two or more of these:

Glycerol, glycol, aliphatic di, tri and poly alcohols, pentaerythritol, its derivatives, all alicylic and cyclic mono, di, tri and poly alcohol, polyethylene glycols, inositol, partially methylated polyols like monoglyme, diglyme and other related compounds.

The ratio of the inorganic acid to the alcohol may vary from 1:1 to 1:10.

In a specific embodiment, the catalyst system comprises phosphoric acid in a range of 20 to 70 wt %, glycol and/or glycerol in a range of 0 to 50 wt/, and water in a range of 0 to 35 wt %. In a further specific embodiment, the weight percentage of phosphoric acid:glycol and/or glycerol:water is in a ratio of 50:20:30.

The invention involves an inorganic acid instead of the conventional highly reactive organic acids like para toluene, para xylene or para benzene sulfonic acids or their derivatives.

Figure 2:
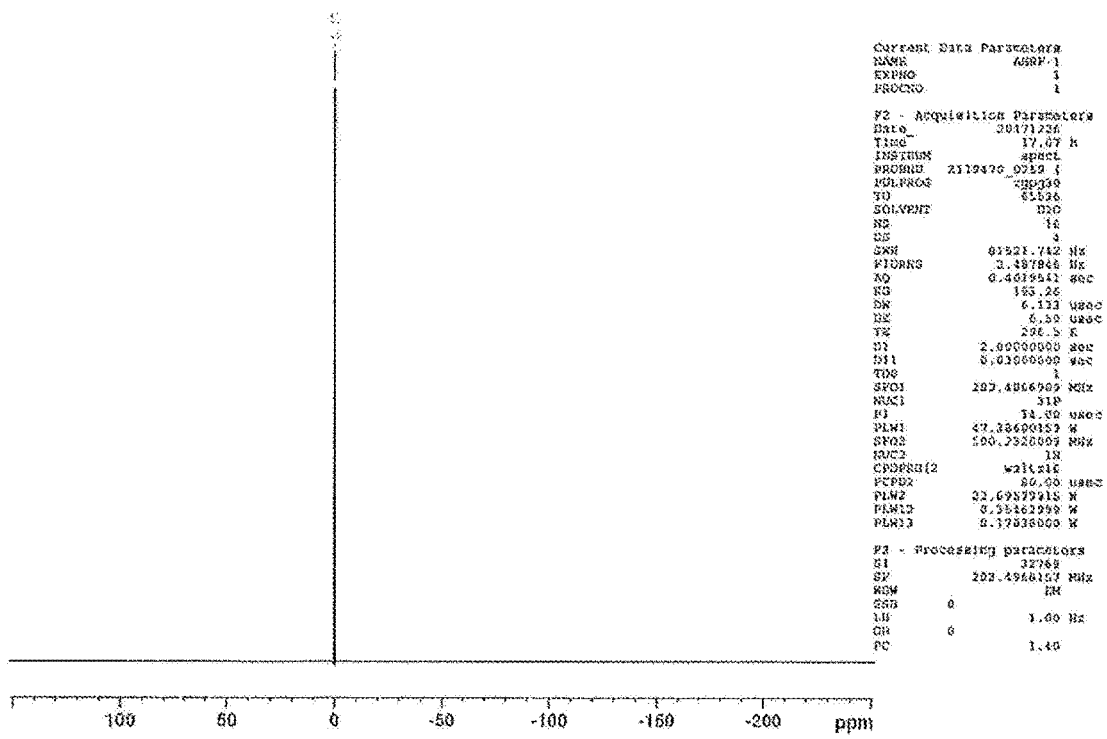
FIG. 2: P-31 NMR of the catalyst according to the present invention comprising a phosphoric acid, ethylene glycol, glycerol, and morpholine.
Figure 3:
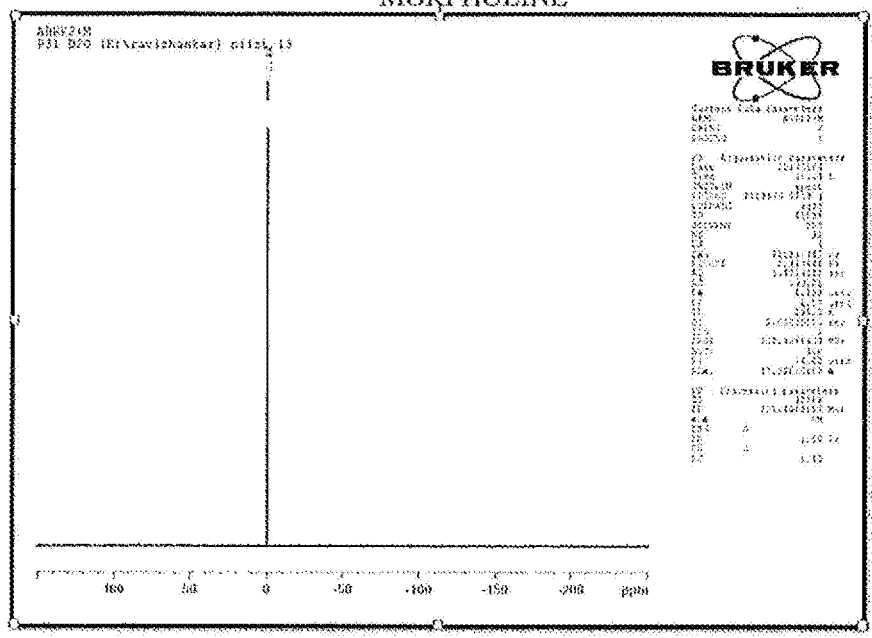
FIG. 3: P-31 NMR on a 3-month old catalyst according to the present invention to show that there is no ester formation with time. Initially it is a mixture and continues to be a mixture with no ester formation.
Figure 4:
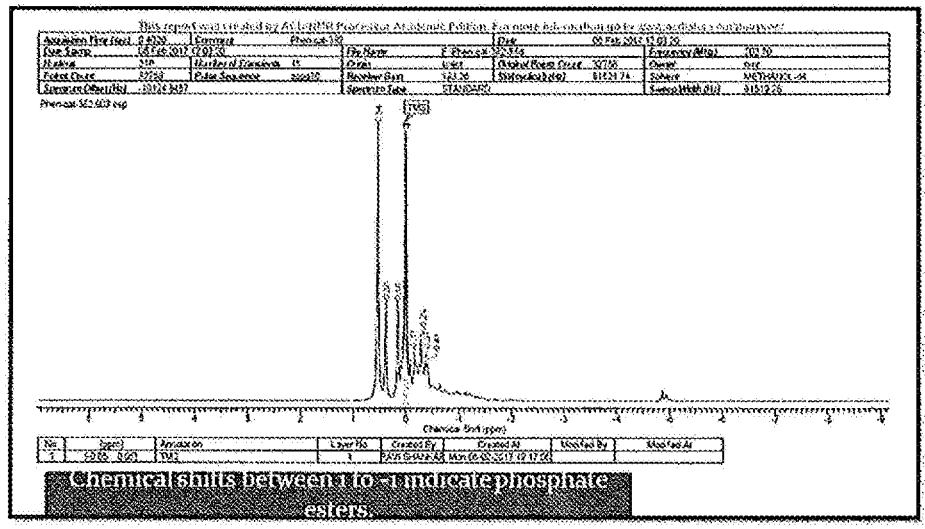
FIG. 4: Comparison of P-31 NMR data for prior art catalyst Phencat-382 wherein the acid and alcohol form an ester and the P-31 NMR of the catalyst of the present invention.
Figure 4:
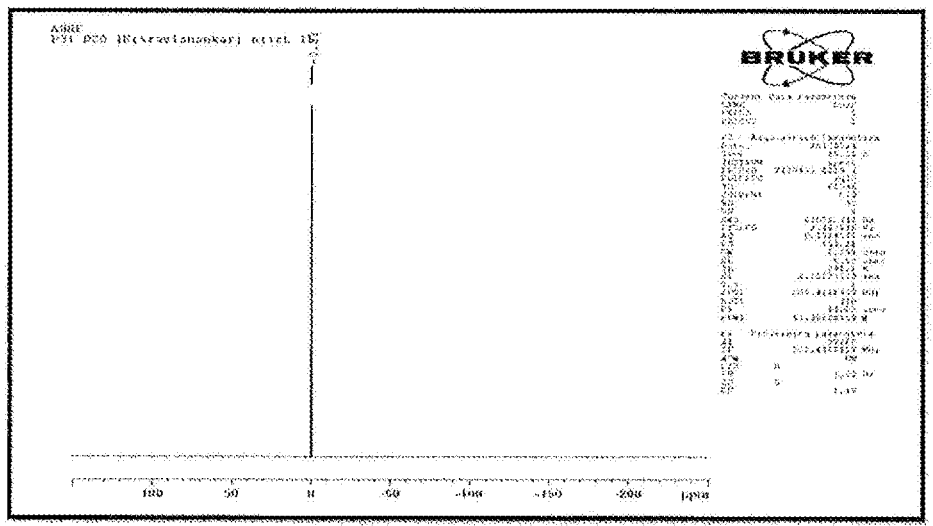

Further, in the catalyst system of the present invention, the acid and the alcohol do not react to form the ester as is the case in the prior art, but they retain their identity. The same is evident from the P-31 data provided in FIGS. 1 and 2.

Further, amines may be added to the above catalyst system. The addition of amines, besides the alcohol and glycerol, gives a more controlled reaction rate that help in lowering the exotherm generated during cure.

Suitable amines which may be used include, but are not limited to morpholine, aliphatic, aromatic, cyclic, acyclic primary, tertiary and secondary amines, their derivatives, triethylamine, triethanol amine, quaternary ammonium salts e.g. tetramethyl ammonium salt, EDTA, trimethyl aminoethanol, hydrazine, choline, phosphatidylcholine etc.

The catalyst system may also comprise one or more solvents to make a water based, or solvent based catalyst. Suitable solvents may be chosen from aliphatic alcohols or other polar solvents.

In an embodiment, phosphoric acid is the inorganic acid, and at least one of glycerine or glycol or their combination is the alcohol. Other acids like alpha olefin sulfonic acids and linear alkylbenzene sulfonic acid are also useful as a catalyst.

Another embodiment of the invention relates to a resole resin composition capable of being thermally cured and having both a long work life and a fast curing rate, and a method for its preparation.

The resole resin composition comprises a mixture of (a) a phenol-formaldehyde resole resin, and (b) a catalyst system comprising an inorganic acid and one or more polyhydric alcohols.

Suitable resoles which may be used include, but are not limited to phenol and formaldehyde, but included are reaction products of all alkyl, aryl, cylic, acylic substituted phenols, cresols and substituted cresols, resorcinol, catechol, para di hydroxy benzenes and their substituted compounds, naphthols, all substituted naphthols and other benzene ring containing aromatic, aliphatic hydroxy, di hydroxyl and poly hydroxyl compounds with formaldehyde resins The percentage of the catalyst in the resole may range from 2 to 20%.

The catalyst of the present invention may be employed as the sole curing (hardening) agent and may constitute about 2-20 weight percent of the phenolic resin solids and more preferably about 8-12 weight percent although higher or lower proportions may be employed depending on specific applications.

A variety of other modifiers can also be added into the resole resin in order to improve toughness and other cured resin properties. These modifiers include, for example, chain terminating phenols, glycols with or without halogen substitution for additional fire retardancy, polyester polyols, polyether polyols, alkyl phenols, hydroxyl containing acrylates and the like and mixtures thereof. The proportion of such modifiers incorporated into the resole resin composition typically ranges from 5 to 35 weight percent (based on the phenol component). Other modifiers such as fire retardants and fillers can be added to complete the phenolic resole resin composition. Reactive modifiers can be added to the resole resin after it has been formulated such as di- and higher polyols, e.g., di- or polyhydric phenols, resorcinol, phloroglucinol, and the like. Finally, modifiers to achieve special effects in particular applications may be appropriate, e.g., polyvinylbutyrals or epoxies for better impact strength in composites.

Another component which may be added to the phenolic resole resin compositions of the present invention is an organic solvent. While the resin composition is predominantly aqueous, a variety of organic solvents can be used in diluting the phenolic resole resin composition to a desired solids concentration or viscosity for certain applications. Suitable organic solvents include aromatic solvents including benzene, toluene, xylene, ethylbenzene, and the like, polar solvents such as furfural, furfuryl alcohol, various Cellosolves, carbitols, ketones, and various alcohols such as ethylene glycol, benzyl alcohol and the like. Generally, such organic solvents may constitute up to 50 weight percent of the total solvent, and preferably not more than 25 weight %. For environmental reasons, water is the preferred as the sole solvent.

Yet another embodiment of the present invention comprises a process for the preparation of the resole resin composition comprising the catalyst system of the present invention by preparing a catalyst by mixing an inorganic acid and one or more polyhydric alcohols, and optionally an amine and mixing a resole resin with the catalyst.

Most of the consumers in tropical countries do not have a controlled temperature/humidity shop floors to manufacture phenolic components. In the summer months, the ambient shop floor temperature reaches over 40° C. and the existing catalysts do not give sufficient work time to make large size components. The catalysts developed in this invention gives about 3 to 4 times longer work life at high ambient temperatures that would enable customers to make large size components.

Accordingly, advantages of the present invention include a catalyst system which imparts improved shelf life to resole resin formulations. Another advantage is that the speed of cure of the shelf stable resole formulations also is hastened. A further advantage is the ability to impart improved shelf stability to standard base-catalyzed resole resin used in the industry for acid curing while maintaining cure speed. These and other advantages will be readily apparent to those skilled in the art based upon the disclosure contained herein.

The following examples are provided to better illustrate the claimed invention and are not to be interpreted in any way as limiting the scope of the invention. All specific materials, and methods described below, fall within the scope of the invention. These specific compositions, materials, and methods are not intended to limit the invention, but merely to illustrate specific embodiments falling within the scope of the invention. One skilled in the art may develop equivalent materials, and methods without the exercise of inventive capacity and without departing from the scope of the invention. It is the intention of the inventors that such variations are included within the scope of the invention.

EXAMPLES

All Gel Time Studies are Carried Out at 35-38 C.

Example 1

A resole resin catalyst system (AHRF-2794-83) was synthesized from the following ingredients and possessed the following properties:

TABLE 1

| Resole 1 | |
|---|---|
| Ingredient | Amount |
| Phosphoric acid | 1500 g |
| Ethylene glycol | 900 g |
| Glycerol | 600 g |

Procedure: 1500 g of phosphoric acid (85%) was added to the mixture of ethylene glycol (900 g) and glycerol (600 g). The mixture was cooled using ice water bath.

Procedure: 200 g of resin (Cellobond: J 2027 X (Batch No. HX477) was mixed with 16 g of the catalyst prepared above to give the following results:

| Gel Time | 30 min |
|---|---|
| Total curing | 32 min |

Example 2

A resole resin catalyst system (AHRF-2794-83A) was synthesized from the following ingredients and possessed the following properties:

TABLE 2

| Resole 1 | |
|---|---|
| Ingredient | Amount |
| Phosphoric acid | 1500 g |
| Ethylene glycol | 900 g |
| Glycerol | 600 g |
| Morpholine | 120 |

Procedure: 1500 g of phosphoric acid (85%) was added to the mixture of ethylene glycol (900 g) and glycerol (600 g). The mixture was cooled using ice water bath. Then 120 g of morpholine was added and cooled.

200 g of resin (Cellobond: J 2027 X (Batch No. HX477) was mixed with 16 g of the catalyst prepared above to give the following results:

| Gel Time | 52 min |
|---|---|
| Total curing | 55 min |

Example 3

A resole resin catalyst system (AHRF-2794-85) was synthesized from the following ingredients and possessed the following properties:

TABLE 3

| Resole 1 | |
|---|---|
| Ingredient | Amount |
| Phosphoric acid | 50 g |
| Ethylene glycol | 30 g |
| Glycerol | 20 g |
| Morpholine | 1.25 g |

Procedure: 50 g of phosphoric acid was added to the mixture of ethylene glycol (30 g) and glycerol (20 g). 1.25 g of morpholine was added to it. The mixture was cooled using ice water bath.

200 g of resin (Cellobond: J 2027 X (Batch No. HX477) was mixed with 16 g of the catalyst prepared above to give the following results:

| Gel Time | 1 hour 6 minutes |
|---|---|
| Total curing | 1 hour 18 minutes |

Example 4

A resole resin catalyst system (AHRF-2794-92) was synthesized from the following ingredients and possessed the following properties

TABLE 4

| Resole 1 | |
|---|---|
| Ingredient | Amount |
| Phosphoric acid | 150 g |
| Ethylene glycol | 90 g |
| Glycerol | 60 g |
| Morpholine | 7.25 g |

Procedure: 150 g of phosphoric acid was added to the mixture of ethylene glycol (90 g) and glycerol (60 g). The mixture was cooled in ice water bath, then 7.25 g of morpholine was added slowly and cooled to room temperature.

200 g of resin (Cellobond: J 2027 X (Batch No. HX477) was mixed with 8 g of the catalyst prepared above to give the following results:

| Gel Time | 50 minutes |
|---|---|
| Total curing | 53 minutes |

Example 5 (Prior Art)

Gel time and Total curing time for prior art catalyst Phencat-382:

| Gel Time | 10 min |
|---|---|
| Total curing | 12 min |

Comparative Example

In order to evaluate its cure response shelf life, samples of the resoles of the present invention were catalyzed with different catalysts, and subjected to comparative studies as follows:

POT LIFE TEST VALUES
TEMPERATURE OF TESTING - (35-38° C.)
Resin: Cellobond: J 2027 X (Batch No. HX477)

| S. NO | Description of catalyst | % addition of catalyst to resin | pot life of resin + catalyst mix-minutes | Lab note book reference page |
|---|---|---|---|---|
| 1 | Conventional catalyst (Phencat 382) | 8 | 10 minutes | 2794-90 |
| 2 | Newly developed catalyst-1 (without additive) (AHRF-2794-83) (Batch No. 170731-3 Kg) | 8 | 32 minutes | 2794-89 |
| 3 | Newly developed catalyst-2 (with additive) (AHRF-2794-92) (Batch No. 170802-3 Kg) | 8 | 50 minutes | 2794-92 |
| 4 | Newly developed catalyst-3 (with additive) (AHRF-2794-83A) (Batch No. 170807-3 Kg) | 8 | 52 minutes | 2794-95 |
| 5 | Conventional catalyst (Phencat 382) | 6 | 18 minutes | 2794-94 |
| 6 | Newly developed catalyst-1 (without additive) (AHRF-2794-83) (Batch No. 170731-3 Kg) | 6 | 50 minutes | 2794-92 |
| 7 | Newly developed catalyst-2 (with additive) (AHRF-2794-92) (Batch No. 170802-3 Kg) | 6 | 95 minutes | 2794-94 |

These results demonstrate the shelf life of the catalyzed resole resin is greater with the inventive catalyst system than with an equivalent resole resin containing only the acid catalyst in twice the amount.

The invention claimed is:

1. A method for curing a resole resin comprising the steps of:
preparing a catalyst by mixing an inorganic acid, one or more polyhydric alcohols, and 1-4 wt % free morpholine, based on the total weight of the catalyst, that when reacted at a higher ambient temperature do not form an ester, and
mixing a resole resin with the catalyst, wherein the inorganic acid comprises phosphoric acid and the one or more polyhydric alcohols comprise glycerol and/or glycol and wherein the catalyst is prepared by mixing the phosphoric acid in a range of 20 to 70 wt %, the glycol and/or glycerol up to 50 wt %, and water in a range of 0 to 35 wt %.

2. The method as claimed in claim 1, wherein the weight percentage of phosphoric acid: glycol and/or glycerol: water is in a ratio of 50:20:30.

3. An ester-free catalyst system for improving the cure time of acid-catalyzed resole resins at higher ambient temperatures, the catalyst system comprising:
20 to 70 wt %, phosphoric acid;
up to 50 wt %, glycol, glycerol or both;
up to 35 wt % solvent, and
1-4 wt % morpholine, based on a total weight of the catalyst system,
wherein the catalyst system does not form an ester when reacted at ambient temperatures of 35-45° C.

4. The catalyst system as claimed in claim 3, wherein the higher ambient temperature includes 40° C.-45° C.

5. The method as claimed in claim 1, wherein the higher ambient temperature includes 35-40° C.

6. The method as claimed in claim 1, wherein the higher ambient temperature includes 40° C.-45° C.

7. The catalyst system as claimed in claim 3, wherein the higher ambient temperature includes 35-40° C.

8. The ester-free catalyst system of claim 3, wherein the solvent is water.

9. The ester-free catalyst system of claim 3, wherein a weight ratio of the phosphoric acid to the glycol and/or glycerol is from 1:1 to 1:10.

10. The method as claimed in claim 1, wherein a weight percentage of the catalyst is 2% to 20% of the resole.

11. The method as claimed in claim 1, wherein a weight ratio of the inorganic acid to the one or more polyhydric alcohols is from 1:1 to 1:10.

12. The catalyst system as claimed in claim 3, wherein the solvent is water or an aliphatic alcohol.

13. The catalyst system as claimed in claim 3, wherein the weight percentage of phosphoric acid: glycol and/or glycerol: water solvent is in a ratio of 50:20:30.

14. A resole resin comprising the catalyst system as claimed in claim 3.

* * * * *